(No Model.)
A. K. DEGOOD.
NEST BOX FOR FOWLS.
No. 402,571. Patented May 7, 1889.
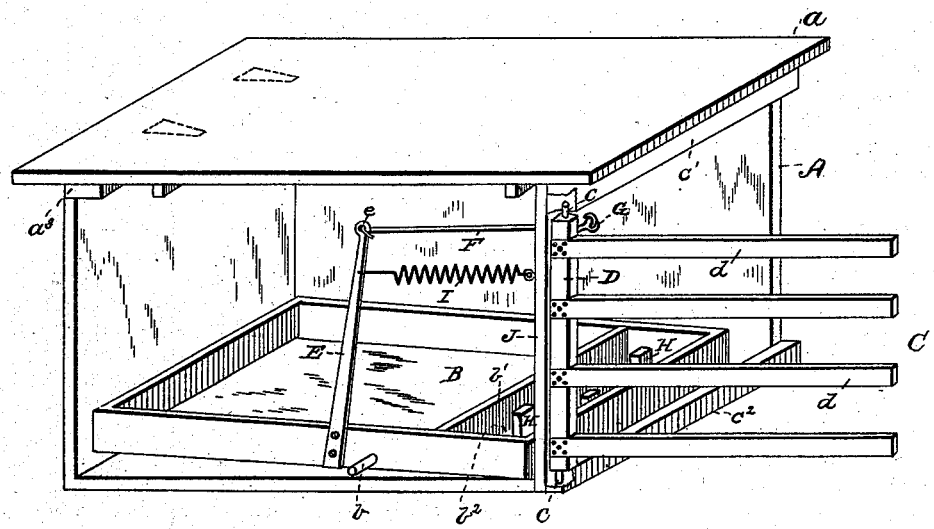
Witnesses:
H. E. Walker
C. H. Northup
Inventor
Alexander K. Degood
by Harris Jay Sulton
Attorneys

UNITED STATES PATENT OFFICE.

ALEXANDER K. DEGOOD, OF MILLSBOROUGH, PENNSYLVANIA.

NEST-BOX FOR FOWLS.

SPECIFICATION forming part of Letters Patent No. 402,571, dated May 7, 1889.

Application filed January 29, 1889. Serial No. 297,936. (No model.)

*To all whom it may concern:*

Be it known that I, ALEXANDER K. DEGOOD, a citizen of the United States, residing at Millsborough, in the county of Washington and State of Pennsylvania, have invented certain new and useful Improvements in Nest-Boxes for Fowls; and I do hereby declare the following to be a full, clear, and exact description of the invention, such as will enable others skilled in the art to which it appertains to make and use the same.

The invention relates to improvements in nest-boxes for fowls; and it consists in the construction and novel arrangement of parts, as hereinafter described, illustrated in the accompanying drawing, and pointed out in the appended claims.

One of the objects of my invention is to provide a nest-box having a laterally-swinging gate so constructed as to allow an uninterrupted exit for the fowl without danger of having its head hung or caught between the bars thereof, as is often the case with gates as formerly constructed.

A further object of my invention is to provide a nest-box having a laterally-swinging gate and a nest which always operates to hold said gate open when the same is not occupied and to automatically close the gate as soon as the fowl steps into the nest.

A further object is to provide means, such as a spring or weight, which will open the gate should the nest fail to open it, owing to the number of eggs therein; and a further object is to provide the box containing the nest with a hinged top or lid so hinged as to afford ready access to the interior thereof and to allow of free circulation of air therein.

In the drawing I have shown by the figure a perspective view of my improved nest-box with one of its sides removed.

Referring more particularly to the drawing, A indicates a box of any desired shape, preferably rectangular, and of convenient size, said box being provided with a lid or top, $a$, hinged at its rear end to a bar, $a^3$, secured to the box and resting at its forward end upon a bar, $c'$. Within the box A is a shallow tray, B, of a shape corresponding to box A, said tray being provided with outstanding journals or pivots $b$ at a point slightly forward of the longitudinal center thereof, said journals or pivots entering suitable recesses in the sides of the box A. This arrangement would allow of the rear part of the tray to tilt; but it is my intention to cause the forward portion of the tray to tilt, and for this purpose I increase the weight of said forward portion by adding a transverse partition, $b'$, forming a receptacle, $b^2$, for sand or a suitable weight, and thus insure the tilting of the forward end of the tray, even should there be a large number of eggs in the nest; or I may accomplish this object by employing a spring, as hereinafter described.

The box A is open at its forward end, and is provided with a gate, C, pivoted by means of the pivots $c$ to the upper and lower transverse bars, $c'$ $c^2$, of the box A. In constructing this gate it will be seen that I use but one end post, D, to which are attached the parallel horizontal bars $d$, which may be of any desired number. I have found that when two end posts are employed the fowl is liable to get its head between the bars when the gate is opening, and is compelled to back away from the gate in order to release its head, and this is very often the cause of a hen not returning to its nest. By my construction this difficulty is avoided. In order to insure the opening of the gate when the nest is unoccupied and to close the same when the fowl has entered her nest, I provide the following means:

E indicates an upright post attached to one side of the tray B in rear of the journals $b$, and having at its upper end an eye, $e$, for the insertion of the hooked end of a rod, F, the other end of which is hooked into an eye or staple, G, attached to the upper end of the post D.

It will be seen that when the nest is unoccupied the tray B will tilt forward, and through the media of the post E and rod F the gate will be opened. When a fowl enters the nest, her weight will cause the rear end of the tray B to tilt downward and thus automatically close the gate.

To always insure the opening of the gate when the nest is unoccupied or when a number of eggs are in the nest, I employ a suitable weight, H, placed in the box $b^2$. I, however, preferably employ a coiled spring, I, one end of which is attached to the post E and its opposite end to the post J of the box A.

Having described my invention, what I claim, and desire to secure by Letters Patent, is—

1. The combination, with the box A, of the tray B, pivoted in the sides of said box, the gate C, hinged to the latter, as described, the upright post E, attached to one side of the tray B, and the rod F, attached at one end to said post and at its other end to the gate, in the manner and for the purpose specified.

2. The combination, with the box A, of the tray B, pivoted in the sides of said box, the gate C, hinged to the latter, as described, the upright post E, attached to one side of the tray B, the rod F, attached at one end to said post and at the other end to the gate, and the spring I, attached at one end to the post and at the other end to the box A, in the manner and for the purpose specified.

In testimony whereof I affix my signature in presence of two witnesses.

ALEXANDER K. DEGOOD.

Witnesses:
MARY MORTON,
H. F. DEEMS.